United States Patent [19]

Kikuchi et al.

[11] Patent Number: 5,220,544
[45] Date of Patent: Jun. 15, 1993

[54] MAGNETIC OPTICAL DISK PLAYER HAVING IMPROVED MAGNETIC FIELD ORIENTATIONS

[75] Inventors: Ikuya Kikuchi; Ryo Sato, both of Saitama, Japan

[73] Assignee: Pioneer Electronic Corporation, Tokyo, Japan

[21] Appl. No.: 525,012

[22] Filed: May 18, 1990

[30] Foreign Application Priority Data

Sep. 22, 1989 [JP] Japan .................................. 1-246901

[51] Int. Cl.$^5$ ...................... G11B 11/10; G11B 13/04
[52] U.S. Cl. ...................................... 369/13; 360/114
[58] Field of Search ............... 369/213, 215, 217, 220, 369/13; 365/122; 360/114, 59

[56] References Cited
U.S. PATENT DOCUMENTS

| | | | |
|---|---|---|---|
| 4,504,935 | 3/1985 | Jansen | 369/220 |
| 4,660,190 | 4/1987 | Fujii et al. | 369/13 |
| 4,672,594 | 6/1987 | Kato et al. | 369/13 |
| 4,701,894 | 10/1987 | Watson | 365/122 |
| 4,750,159 | 6/1988 | Yoda | 360/59 |
| 4,763,314 | 8/1988 | McCaslin et al. | 369/215 |
| 4,802,021 | 1/1989 | Nakagawa et al. | 360/114 |
| 4,803,674 | 2/1989 | Nakao et al. | 365/122 |
| 4,939,711 | 7/1990 | Yoda | 360/114 |
| 4,959,820 | 9/1990 | Horimai et al. | 369/13 |
| 4,972,395 | 11/1990 | Baba | 360/114 |
| 4,977,549 | 12/1990 | Berg | 360/114 |
| 4,977,554 | 12/1990 | Hangai et al. | 369/215 |

*Primary Examiner*—Eugene R. LaRoche
*Assistant Examiner*—Christopher R. Glembocki
*Attorney, Agent, or Firm*—Sughrue, Mion, Zinn, Macpeak & Seas

[57] ABSTRACT

A magnetic optical disk player comprises a turn table for turning a magnetic optical disk, guides for guiding a recording head carriage and an erasing head carriage along two different radial directions of the turn table, drivers for individually driving the recording head carriage and the erasing head carriage, and bias magnets for generating bias magnetic fields distributed along moving areas of the recording and erasing head carriages and having the directions opposite to each other, wherein the drivers include movable coils coupled with the recording head carriage and the erasing head carriage, drive magnets for generating drive magnetic fields interlinking the recording head coil and the erasing head coil, and a leaking flux from the drive magnets passes through the plane in the same direction of the bias magnetic field. The directions of the bias magnetic fields for erasing and recording heads are opposite to each other. The drive magnetic fields for positioning the erasing head carriage and the recording head carriage are also opposite to each other. The bias magnetic field and the drive magnetic field are additively coupled with each other.

7 Claims, 3 Drawing Sheets

MAGNETIC OPTICAL DISK PLAYER HAVING IMPROVED MAGNETIC FIELD ORIENTATIONS

RELATED CASE

This case is related to U.S. application Ser. No. 07/524,932, filed on the same date as this case, having an inventorship of KIKUCHI ET AL, being assigned to a common assignee, and entitled "MAGNETIC OPTICAL DISK PLAYER".

FIELD OF THE INVENTION

The present invention relates to a magnetic optical disk player using a so-called Kerr effect.

BACKGROUND OF THE INVENTION

Recently, a magnetic optical recording reproducing system based on the Kerr effect has been developed, and it is desired to realize its practical use.

Intensive study to realize the practical use of the magnetic optical disk player has been made. The magnetic optical disk player is different from the conventional optical disk player. In the magnetic optical disk player, a relatively strong magnet for applying a bias magnetic field extends along the moving areas of a record/reproducing head and an erasing head.

In a guide drive mechanism for positioning the heads in the radial directions of the disk, each head carriage is magnetically driven by a movable coil integrally coupled with the carriage, to position the head. The drive magnetic field for generating the electromagnetic force adversely influences the bias magnetic field. This occurrence degrades the recording and erasing characteristics of the player.

SUMMARY OF THE INVENTION

An object of the present invention is to provide a magnetic optical disk player which is free from the adverse effect by the magnetic field for head carriage driving, and hence degradation of the recording and erasing characteristics.

To achieve the above object, a magnetic optical disk player according to the present invention comprises a turn table for turning a magnetic optical disk, guide means for guiding a recording head carriage mounting a recording head and an erasing head carriage mounting a erasing head, along a plane including a disk support surface of the turn table in two different radial directions of the turn table, drive means for individually driving the recording head carriage and the erasing head carriage, and bias magnetic field generating means for generating bias magnetic fields distributed along moving areas of the recording and erasing head carriages and having the directions opposite to each other, wherein the drive means includes movable coils coupled with the recording head carriage and the erasing head carriage, drive magnetic field generating means for generating drive magnetic fields interlinking the recording head coil and the erasing head coil, and wherein a leaking flux from drive magnetic field generating means passes through the plane in the same direction of the bias magnetic field.

With such an arrangement, the directions of the bias magnetic fields for erasing and recording heads are opposite to each other. The drive magnetic fields for positioning the erasing head carriage and the recording head carriage are also D opposite to each other. Accordingly, the bias magnetic field and the drive magnetic field are additively coupled with each other.

DETAILED DESCRIPTION OF PREFERRED EMBODIMENT

An embodiment of the present invention will be described with reference to the accompanying drawings.

Figure 1:
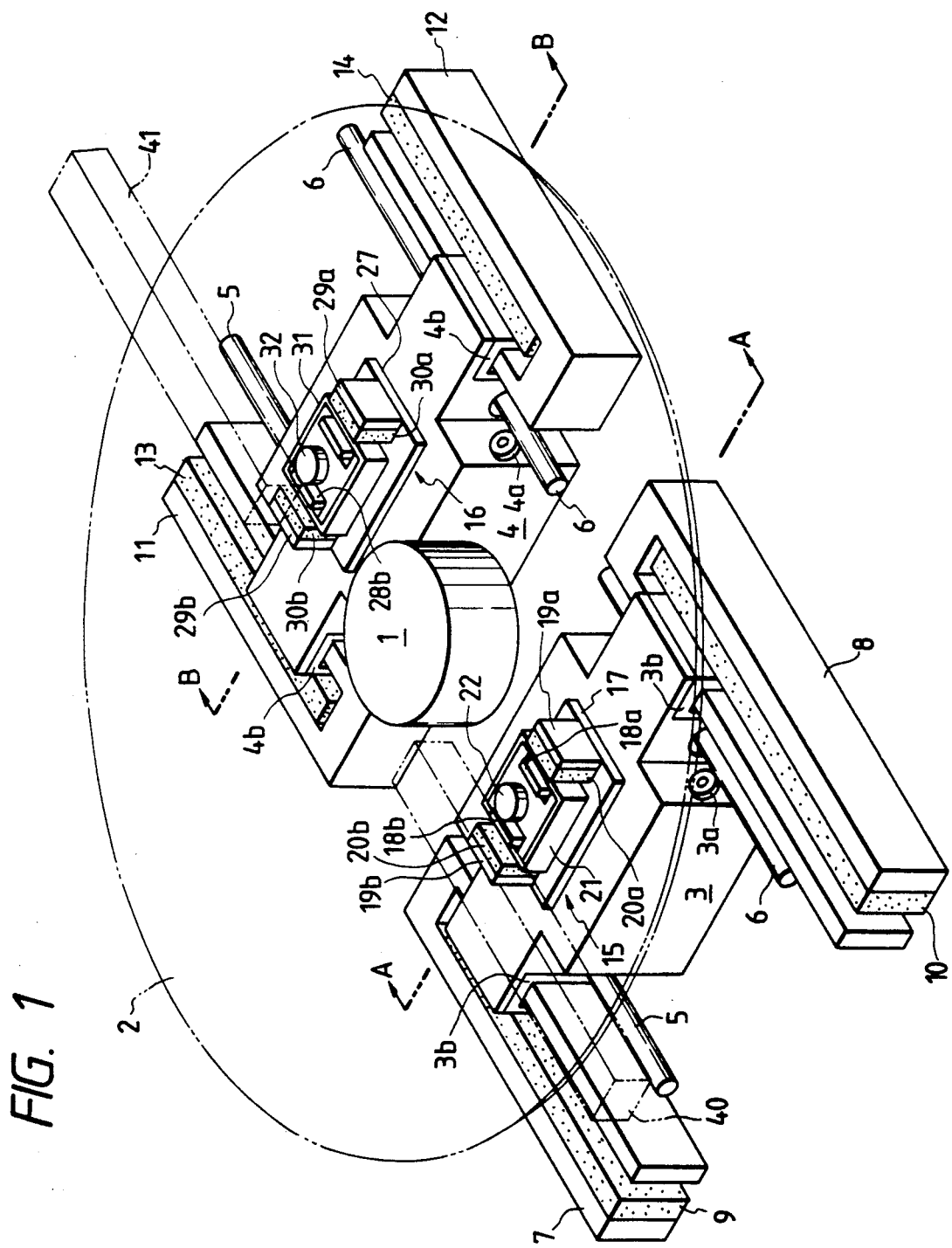
FIG. 1 is a perspective view showing a magnetic optical disk player according to the present invention.

In a magnetic optical disk player shown in FIG. 1, a turn table 1 supports the bottom of a magnetic optical disk 2, and turns the disk 2. A clamp mechanism (not shown) cooperates with the turn table 1 to fixedly clamp the magnetic optical disk to the turn table 1 at playing music. The magnetic optical disk illustrated is transparent for ease of explanation. In two different radial directions on the turn table 1, a recording head carriage 3 and an erasing head carriage 4 are movable along a plane, containing a disk carrying face of the turn table 1, with the assistance of carriage rollers 3a and 4a and parallel guide rods 5 and 6. The recording head carriage 3 and the erasing head carriage 4 are constructed with block-like members, respectively. Carriage coils 3b and 3b are respectively fastened to both end portions of the recording head carriage 3. Carriage coils 4b and 4b are respectively fastened to both end portions of the erasing head carriage 4.

The carriage coils 3b and 3b slidably cover the inner legs of U-shaped carriage yokes 7 and 8, respectively. Carriage magnets 9 and 10 are bonded to the inner walls of the outer legs of the carriage yokes 7 and 8, respectively. With such a structure, the carriage coils 3b and 3b are respectively movable crossing magnetic fluxes developed in magnetic gaps as formed by the gaps defined within each of the U-shaped carriage yokes 7 and 8 with the carriage magnets 9 and 10 respectively disposed therein. The carriage coils 4b and 4b are respectively movable crossing magnetic fluxes developed into magnetic gaps as formed by the gaps defined within each of the U-shaped carriage yokes 11 and 12 with the carriage magnets 13 and 14 respectively disposed therein. A carriage servo circuit (not shown) feeds currents to the carriage coils 3b and 3b, and 4b and 4b, in order to appropriately position the recording head carriage 3 and the erasing head carriage 4.

The recording head carriage 3 and the erasing head carriage 4 carry a recording head 15 and an erasing head 16, respectively. The structures of recording head 15 and the erasing head 16 will be described in detail. The recording head 15 first follows. In the recording head 15, two sets of inner and outer yokes 18a and 19a, and 18b and 19b are provided on a yoke bottom plate 17. Actuator magnets 20a and 20b are respectively fastened to the inner walls of the outer yokes 19a and 19b, thereby to form two magnetic gaps defined by the inner and outer yokes, respectively. The faces of the actuator magnets 20a and 20b, which abut on the outer yokes 19a and 19b, serve as N poles of the magnets. Accordingly, the fluxes in the magnetic gaps are directed from the outer yokes 19a and 19b to the inner yokes 18a and 18b. A movable bobbin 21 is provided so as to be movable with respect to the yoke bottom plate 17. The inner yokes 18a and 18b are respectively placed in two holes of the movable bobbin 21, with freedom of their movement within the holes. Focusing and tracking movable coils (not shown) are fixed to the peripheral wall of the movable bobbin 21. Accordingly, these coils are movable crossing the magnetic fields developed in the magnetic gaps. An optical system containing an objective lens 22, which is installed on the movable bobbin 21, irradiate a light spot on the magnetic optical disk 2, and receives a light beam reflected from the disk.

In the erasing head 16, two sets of inner and outer yokes 28a and 28b, and 29a and 29b are provided on a yoke bottom plate 27. Actuator magnets 30a and 30b are respectively fastened at the S pole faces to the inner walls of the outer yokes 29a and 29b, thereby to form magnetic gaps between the inner and outer yokes, respectively. In the magnetic gaps, the fluxes are directed from the inner yokes 28a and 28b to the outer yokes 29a and 29b. A movable bobbin 31 is provided, which carries focusing and tracking movable coils which alter the magnetic fluxes of the magnetic gaps to thereby control movement of the bobbin. An optical system containing an objective lens 32 is installed on the movable bobbin 31.

The recording and erasing heads 15 and 16 are operated by emitting a light beam from the optical system and processing of an electrical signal derived from a photosensor which is responsive to a reflected light beam. The recording head may be used as a reproduction head.

A magnet 40 for applying a recording bias magnetic field and a magnet 41 for applying an erasing bias magnetic field are disposed in opposition to the moving areas of the recording head 15 and the erasing head 16 with respect to the magnetic optical disk 2. The side of the bias magnetic field applying magnet 40 facing the disk 2 serves as the N pole. The recording bias magnetic field passes through the disk 2 from the upper side to the lower side. The side of the bias magnetic field applying magnet 41 facing the disk 2 serves as the S pole. The erasing bias magnetic field passes through the disk 2 from the lower side to the upper side.

Figure 2A:
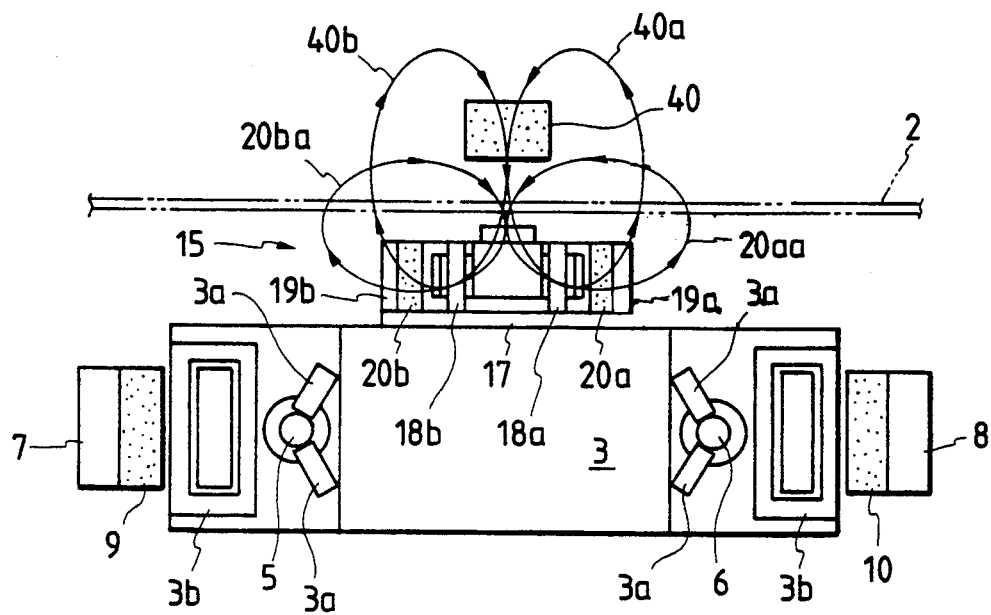
FIGS. 2A and 3A are sectional view taken on line A—A in FIG. 1.

Distributions of the magnetic fluxes developed in the magnetic optical disk player thus arranged will be described with reference to FIGS. 2A and 2B. As shown in FIG. 2A, a magnetic flux developed by the recording bias magnetic field applying magnet 40 vertically passes the disk 2 from the upper side to the lower side directly under the magnet 40, as indicated by loops 40a and 40b. Magnetic fields of the actuator magnets 20a and 20b are as indicated by loops 20aa and 20ba. The magnetic fields 40a and 40b, and 20aa and 20ba are in the same direction within the recording head 15. Accordingly, the magnetic fields by the actuator magnets 20aa and 20ba will never be cancelled out by the magnetic field by the magnet 40.

Figure 2B:
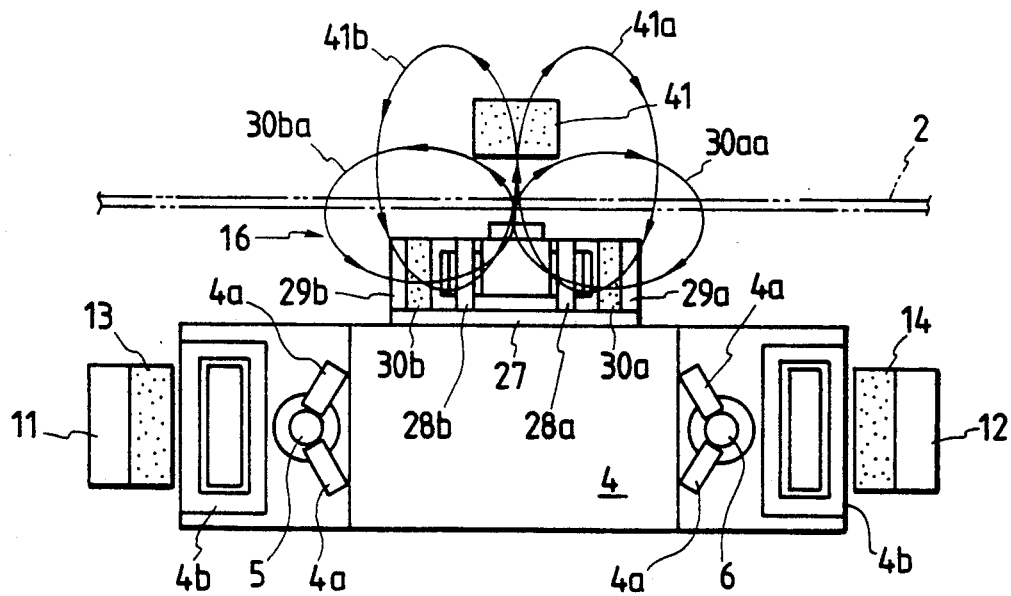
FIGS. 2B and 3B are sectional view taken on line B—B in FIG. 1.

As shown in FIG. 2B, an erasing bias magnetic field by the magnet 41 passes through the disk 2 from the lower side to the upper side directly under the magnet 41, as indicated by loops 41a and 41b.

Magnetic fields developed by the actuator magnets 30a and 30b in the erasing head 16 are developed as indicated by loops 30aa and 30ba. As shown, the erasing bias magnetic fields 30a and 30b are opposite in direction to the electromagnetic force generating magnetic fields 20aa and 20ba in the recording head 15. The erasing bias magnetic field is also opposite in direction to the recording bias magnetic field. Accordingly, the magnetic fields 41a and 41b, and 30aa and 30ba are in the same direction to additively coupled with each other. For the above reasons, the erasing head is free from the adverse effects by the erasing bias magnetic field, and rather contributes to improved servo response sensitivity of the erasing head 16.

Figure 3A:
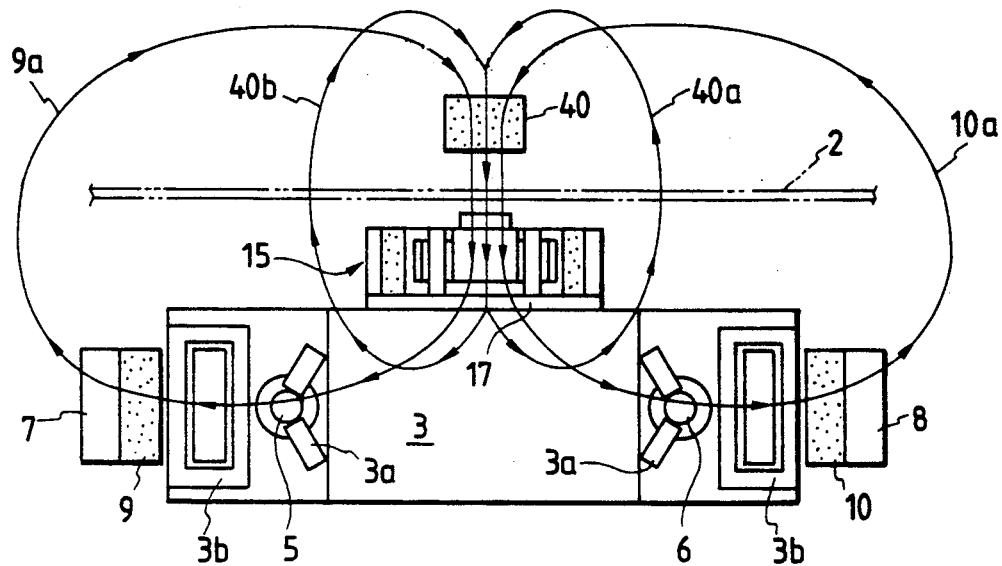
Figure 3B:
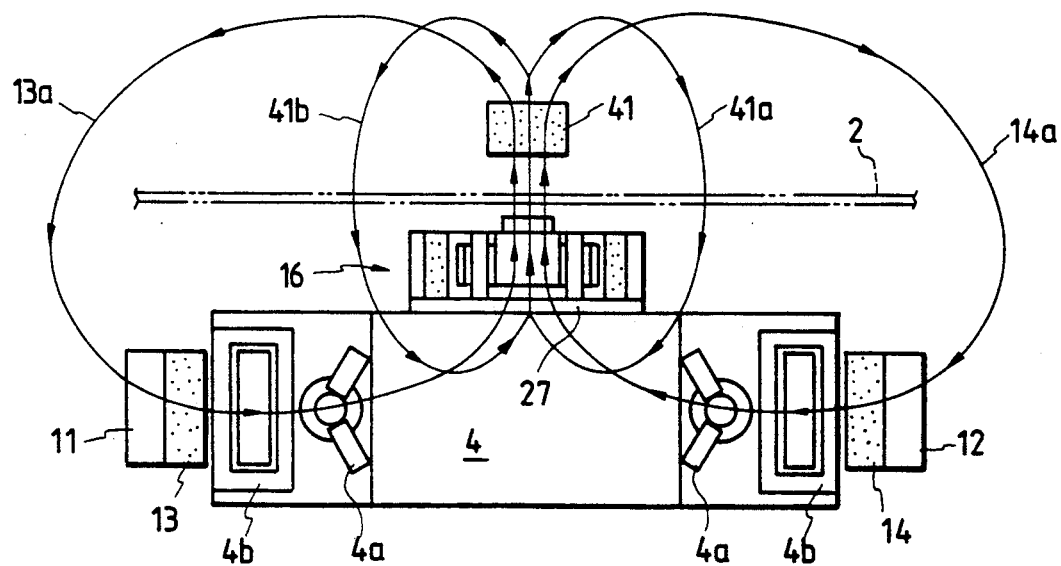

FIGS. 3A and 3B show distributions of recording bias magnetic fields 40a and 40b, and the erasing bias magnetic fields 41a and 41b, and leaking fluxes 9a, 10a, and 13a, and 14a from the carriage magnets 9, 10, 13 and 14.

As shown in the figures, the recording bias magnetic fields 40a and 40b are in a direction from the upper side surface of the disk 2 to the lower side surface. The erasing bias magnetic fields 41a and 41b are in from the lower side surface of the disk 2 to the upper side surface.

The polarities of the carriage magnets 9 and 10, and 13 and 14 are so selected that the drive magnetic fields 9a and 10a for driving the recording head carriage 3, and the drive magnetic fields 13a and 14a for driving the erasing head carriage are opposite in direction to each other in a plane of orthogonal to the radial direction of the disk 2. The faces of the magnets 9 and 10, which face with the recording head 3 interposing therebetween, serve as S poles. The faces of the magnets 13 and 14, which face with the erasing head 4 interposing therebetween, serve as N poles.

Accordingly, the leaking fluxes from the carriage magnets and the bias magnetic fields are in the same direction and additively coupled in the disk 2 directly under the magnets 40 and 41. The bias magnetic field will never be cancelled out by the leaking fluxes from the carriage magnets.

As seen from the foregoing description, in the magnetic optical disk player, the recording and erasing bias magnetic fields and the leaking magnetic fields from the carriage magnets are additively coupled in the vicinity of the recording and erasing heads. Accordingly, the bias magnetic field will never be adversely influenced by the leaking magnetic fields from the carriage magnets.

What is claimed is:

1. A magnetic optical disk player, comprising:
   a turn table for turning a magnetic optical disk;
   guide means for guiding a recording head carriage carrying a recording head and an erasing head carriage carrying an erasing head, along a plane including a disk support surface of said turn table in two different radial directions of said turn table;
   first drive means for driving said recording head carriage and including a movable recording head coil coupled with said recording head carriage;
   second drive means for driving said erasing head carriage and including a movable erasing head coil coupled with said erasing head carriage;
   recording and erasing bias magnetic field generating means for generating bias magnetic fields distributed along moving areas of said recording and erasing head cartridges, said bias magnetic fields distributed along said recording and erasing head carriages having directions opposite to each other; and
   recording and erasing drive magnetic field generating means for generating drive magnetic field respectively applied to said recording head coil and said erasing head coil to drive said recording head carriage and said erasing head carriage, wherein leaking fluxes from said recording and erasing drive magnetic field generating means respectively pass through said plane in the same direction as said recording and erasing bias magnetic fields as the fluxes pass through the disk sector immediately adjacent the bias magnetic field generating means.

2. The magnetic optical disk player according to claim 1, wherein the bias magnetic field generating means includes two permanent magnetic having magnetic pole faces, which are located on the opposite side of said moving areas of said recording and erasing head carriages with respect to said plane, and extend along said moving areas.

3. The magnetic optical disk player according to claim 1, wherein said bias magnetic field and said drive magnetic fields are distributed along a plane orthogonal to said radial direction.

4. A magnetic optical disk player comprising:
 a turn table for turning a magnetic optical disk player;
 recording head carriage movable along first radial direction of the disk, on which recording head means is mounted;
 recording bias magnetic field generating means for generating a recording bias magnetic field distributed along said first radial direction;
 erasing head carriage movable along second radial direction of the disk, on which erasing head means is mounted;
 erasing bias magnetic field generating means for generating an erasing bias magnetic field distributed along said second radial distribution;
 first drive means for driving said recording head carriage, including movable coil coupled with said recording carriage and first drive magnetic field generating means for generating first drive magnetic field applied to said movable coil to drive said recording head carriage;
 second drive means for driving said erasing head carriage, including movable coil coupled with said erasing carriage and drive magnetic field generating means for generating second drive magnetic field applied to said movable coil to drive said erasing head carriage;
 wherein said recording bias magnetic field and said first drive magnetic field are toward a first direction, and said erasing bias magnetic field and said second drive magnetic field are toward a reverse direction as said magnetic fields pass through the disk sector immediately adjacent to said recording and erasing magnetic field generating means.

5. The magnetic optical disk player according to claim 4, wherein said recording and erasing bias magnetic field generating means includes permanent magnets, which are located on the opposite side of the moving areas of said recording and erasing head carriages with respect to the disk, and extend along said moving area.

6. The magnetic optical disk player according to claim 5, wherein said recording and erasing bias magnetic field and said first and second drive magnetic fields are distributed along a plane orthogonal to said radial direction.

7. A method of operating a magnetic optical disk player, comprising the following steps:
 rotating a magnetic optical disk on said player;
 guiding a recording head carriage carrying a recording head and an erasing head carriage carrying an erasing head, along a plane including said disk in two different radial directions of said disk;
 providing a movable recording head coil which is coupled to said recording head carriage;
 providing a movable erasing head coil which is coupled to said erasing head carriage;
 generating recording and erasing bias magnetic fields, respectively distributed along moving areas of said recording and erasing head carriages, which are in opposite directions;
 determining the respective directions of said recording and erasing magnetic fields;
 generating recording and erasing drive magnetic fields with a generating means which are respectively applied to said recording head coil and said erasing head coil to drive said recording head carriage and said erasing head carriage;
 determining the direction of leaking fluxes from said recording and erasing drive magnetic fields; and
 arranging said generating means such leaking fluxes respectively pass through said plane in the same direction as said recording and erasing bias magnetic fields as the fluxes pass through the disk sector immediately adjacent the bias magnetic field generating means.

* * * * *